Jan. 3, 1950

P. GLASS 2,493,130

SELECTIVE OUTPUT SATURABLE REACTOR AMPLIFIER CIRCUIT

Filed July 12, 1945

INVENTOR.
Paul Glass,
Chritton, Wiles, Schroeder, Merriam & Hofgren
his Attys.

Patented Jan. 3, 1950

2,493,130

UNITED STATES PATENT OFFICE 2,493,130

SELECTIVE OUTPUT SATURABLE REACTOR AMPLIFIER CIRCUIT

Paul Glass, Chicago, Ill., assignor to Askania Regulator Company, Chicago, Ill., a corporation of Illinois Application July 12, 1945, Serial No. 604,656

7 Claims. (Cl. 321—25)

The invention relates generally to electrical control circuits and more particularly to control circuits wherein a small signal is utilized to govern substantially larger power application or where the signal is amplified or modified, or both, for subsequent use in its amplified and/or modified form.

Heretofore circuits of the character described have depended largely upon electron tubes for accomplishment of the ends sought, necessitating complicated circuits or excessive numbers of stages of amplification with the resultant disadvantages of high cost, operational and maintenance difficulties and, above all, the disadvantage that the controlling portion of the circuit was not completely independent of the controlled portion so that reaction in the controlled portion might reflect into the controlling portion with possible resultant injury thereto.

It is an object of this invention, therefore, to provide new and improved circuits for the amplification or modification, or both, of a signal or for the utilization of a small signal in the control of substantially larger power application.

Another object is to provide a new and improved circuit of the character described having an electron tubeless, main amplification or control stage and an input signal circuit in advance of the main stage conditioning the signal by modification and possibly also amplification for use in connection with the main stage.

A further object is to provide a control circuit, including saturable reactors, which will function, under the control of a D. C. signal, to produce a D. C. output of a given magnitude wholly independent of the magnitude of the signal but varying in sign with the sign of the signal.

Still a further object is to provide a control circuit, including saturable reactors, which will function, under the control of a D. C. signal, to produce an A. C. output of a given magnitude independent of the magnitude of the signal, the output being at one or the other of two output stations dependent upon the sign of the signal.

Other objects and advantages will become apparent from the following detailed description taken in connection with the accompanying drawings, in which.

Figures 1, 2:
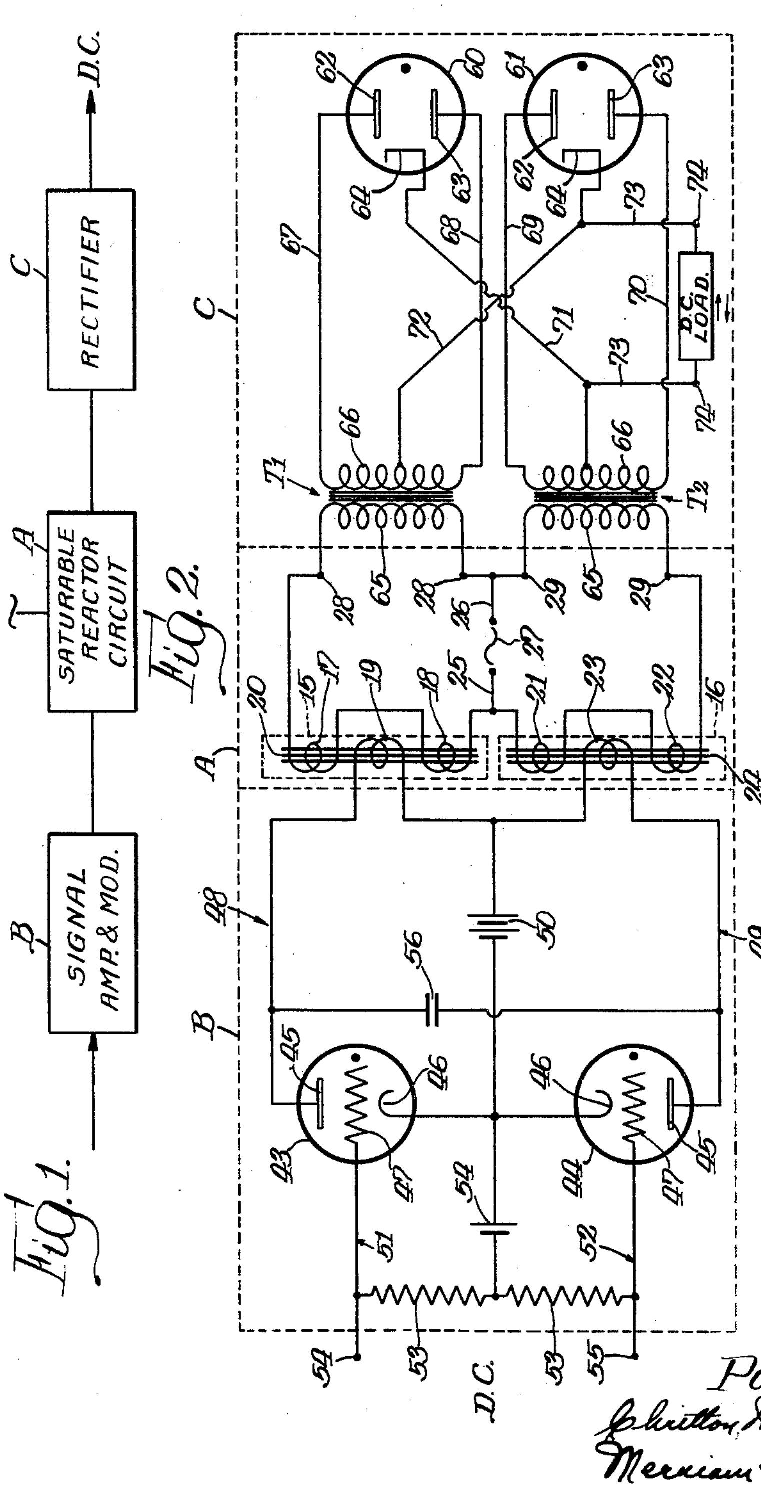
Fig. 1 is a box-type diagrammatic illustration of a circuit embodying the features of this invention.
Fig. 2 is a circuit diagram illustrating in detail a possible construction that the units represented by the rectangles in Fig. 1 may take.

For purposes of disclosure there is shown in the drawing and will hereinafter be described a specific circuit, being an illustrative embodiment of the invention. It is not intended, however, that the invention is to be limited thereby to the specific disclosures made. On the contrary, it is intended to cover all modifications and alternative constructions falling within the spirit and scope of the invention as defined in the appended claims.

Generally speaking, the invention contemplates the provision of a new and improved circuit wherein a small electrical signal is utilized to govern substantially larger power applications or where the signal is amplified or modified, possibly both, for subsequent use in its new form. In such a circuit the input is a controlling signal while the output is a controlled signal regardless of whether the latter is of a magnitude commonly referred to as a signal or is of such magnitude as to be, or is in fact, the operating energy for an electrical device such as a motor or the like. To that end, the circuit is composed generally of means for modifying and possibly amplifying the controlling or the controlled signal, and means functioning as the main amplifying or control means.

Herein the general circuit (see Fig. 1) is composed of three subcircuits or circuit units or portions A, B and C. Of these units, A is the main amplifying or control means or circuit and functions to have an alternating current output controlled as to magnitude and sign by the controlling or input signal, but having an independent power source so that the absolute power output is not limited by the power of the signal source. Unit B is the control signal receiving unit. This unit usually functions to amplify the signal but, above all, it modifies the character of the signal so as first to obtain a signal of a character suitable for use with unit A, and, secondly, to obtain a signal of such character as to result in an output of a character desired. Herein the signal is so modified as to have an on or off characteristic, i. e., the modified signal is either zero or a certain maximum value regardless of the magnitude of the input signal. Unit C is also a modifier of the signal which it receives, though herein the function of unit C is always that of a rectifier converting the A. C. output of unit A to a D. C. output. The term "direct current" or its abbreviation D. C., as herein employed to designate the output of the units C and B and the control coils of the unit A, is used in the broad sense of that term, i. e., as opposed to alternating current and as including pulsating current such as produced by a generator or rectifier and not in the limited sense only of absolutely continuous, pulse-free current such as produced by a chemical cell under constant load.

As the description proceeds, it will become apparent that by appropriate construction of the unit B and by use or elimination of the unit C the invention may be employed to respond to a D. C. input or control signal, while obtaining either an A. C. or a D. C. output. Moreover, by the employment of a D. C. signal receiving unit B of the character hereinafter described, circuits embodying the concept of this invention may be employed to obtain an A. C. output which is either zero or some definite magnitude regardless of the magnitude of the input signal; and similarly a D. C. output may be obtained which also is either zero or some definite magnitude regardless of the magnitude of the input signal. In the case of the A. C. output, this is herein made available at one or the other of two stations dependent upon the sign of the signal. In the case of the D. C. output, the sign thereof is controlled by the sign of the input signal. Thus circuits embodying the concept of this invention may be employed to obtain an A. C. or a D. C. output of definite and constant value from a D. C. input signal of varying magnitude; the sign of the D. C. output varying with the sign of the input signal and the A. C. output being controlled as to output station by the sign of the input signal. In speaking of A. C. or D. C. currents or outputs, average and effective and not instantaneous values or magnitudes are intended.

Turning now to a consideration of the more detailed embodiments of the invention, the unit A will first be described. This unit, as already stated, is the main amplification stage and control unit or subcircuit and accomplishes control of the magnitude of the output and its availability at one or the other of two stations in accordance with the magnitude and sign of the signal without the employment of electron tubes. Referring to Fig. 2, the unit A comprises a pair of saturable reactors represented by the broken-line rectangles 15 and 16. The saturable reactor 15 is composed of a pair of A. C. coils 17 and 18 and of a D. C. or control coil 19. All of the coils are wound on a common iron core 20 in such manner that current flowing in the coils 17 and 18 will not induce current or voltage in the D. C. coil 19, while flux produced by direct current flowing in the D. C. coil 19 will vary the impedance of the A. C. coils 17 and 18 by varying the degree of saturation of the core 20. The reactor is further so designed that the coils 17 and 18 have a very high impedance when no current is flowing in the D. C. coil 19. Necessarily the reactor and particularly the coils thereof must be designed with a view to the voltages with which it is to be employed, with the coils 17 and 18 being capable of taking substantially the full applied voltage when no current is flowing in the D. C. coil 19. The saturable reactor 16 is identical with the reactor 15 and comprises A. C. coils 21 and 22 and a D. C. or control coil 23, all wound on a common iron core 24.

The unit A sometimes hereinafter referred to as the saturable reactor circuit is completed by an A. C. supply circuit comprising power supply leads 25 and 26, adapted to be connected to an A. C. power source represented at 27, and two output stations herein represented by pairs of terminals 28 and 29, the unit A thus being adapted for the connection thereto of two loads. The A. C. coils of the saturable reactors are so connected in the supply circuit that one of the pairs of terminals 28, 29 will be subjected to substantially the full potential of the power source while the other will have small or negligible potential, depending upon which of the reactors has its control coil energized at the time. To that end, the saturable reactors, that is, the A. C. coils thereof, are connected in separate yet interconnected circuits each having the A. C. coils of one reactor, the terminals representing one station, and the A. C. power source in series, with the power source common to the two circuits. Herein the terminals 28 are connected in series with the coils 17 and 18 of the saturable reactor 15, the coils also being in series, and the terminals 29 are in series with the coils 21 and 22 of the saturable reactor 16, the coils again being also in series. Inasmuch as the saturable reactors are designed so as to be capable of taking substantially the full applied voltage of the power source 27 when the control coils 19 and 23 are not energized, it follows that energization of one or the other of the control coils 19 and 23 will determine which of the pairs of terminals 28 and 29 will have such a small voltage applied thereto as to be incapable of energizing a load connected to the terminals and which of the terminals on the other hand will have an effective potential.

Figure 3:
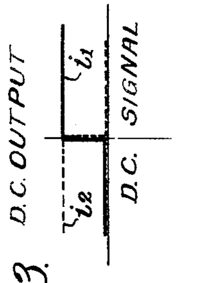
Fig. 3 is a diagram illustrating the character of the output of the first unit of the circuit.

In the embodiment of the invention shown in Fig. 2, the circuit is adapted to respond to a D. C. input or control signal; an embodiment adapted to respond to an A. C. input signal being disclosed and claimed in my divisional application Serial No. 97,893, filed June 8, 1949. Accordingly, there is illustrated, by way of example, a unit B which is operable to receive a D. C. signal, amplify the same to a magnitude suitable for use in connection with the saturable reactors 15 and 16, and at the same time, modify the signal to give it a desired characteristic and cause energization of one or the other of the D. C. coils 19 and 23, depending upon the sign of the input signal, but never both coils simultaneously for any material period of time. Herein the unit B is of such character that an input signal will cause energization of the D. C. coils 19 and 23, as shown in Fig. 3, wherein the line $i1$ represents the current flowing in the coil 19 and $i2$ represents the current flowing in the coil 23. In other words, so long as the input signal is and remains zero the current in each of the coils 19 and 23 will also be zero. With an increase in the signal magnitude, regardless of how small, that is, with any signal of a magnitude other than zero, the current in one coil will remain at zero while the current in the other coil will jump to some definite and constant magnitude as represented in Fig. 3. As will presently be more fully made known, once operation of the unit B has been initiated, one or the other of the coils 19, 23 will be energized even when the signal returns to zero. Which of the coils 19 or 23 will be energized and which will be deenergized will, however, be determined by the sign of the input signal. Note that the unit B as to the individual coils 19 and 23 has an off or full-on characteristic and as to the unit as a whole has what will result in a load selection characteristic at an intermediate stage in the circuit and a sign controlling characteristic in the final output of the circuit.

While a unit B capable of producing currents in the coils 19 and 23 of the character described might take a variety of forms, one such unit is shown in Fig. 2, it being understood that the showing is exemplary only and that a variety of other subcircuits might be employed and that, in particular, it might prove necessary to have more than one stage to produce the amplification of the signal required to provide direct currents of a magnitude suitable for control of saturable reactors. Herein the unit B or signal input circuit comprises a pair of grid controlled, gaseous tubes 43 and 44 each having a plate 45, a cathode 46 and a grid 47. The tube 43 has a plate circuit, generally designated 48, which includes the D. C. coil 19 of the saturable reactor 15 and the tube 44 has a plate circuit, generally designated 49, which includes the D. C. coil 23 of the saturable reactor 16. A D. C. voltage source, herein shown as a battery 50 common to the two plate circuits 48 and 49, supplies the plate voltage of the tubes. Each of the tubes 43 and 44 has a grid circuit, generally designated 51 and 52, respectively, with each circuit including a resistance 53 and a grid bias voltage source, here shown as a battery 54, common to the two grid circuits. The D. C. signal input terminals 54 and 55 are connected to the not common ends of the resistances 53. Inasmuch as the tubes are of the gaseous type and their plate voltage is supplied by a battery, a tube once fired will continue to fire even though the signal is removed from its grid or made negative. Hence there is connected across the plate circuits of the tubes 43 and 44 a condenser 56 which functions in well known manner to extinguish that one of the tubes from which the positive incoming signal is withdrawn. This means, of course, that the unit B here described has no neutral or off position, in so far as the signal is concerned, once one of the tubes is caused to fire. The unit is, in effect, therefore, a reversing switch without a neutral or central position. It also means that the tubes will fire simultaneously for that infinitesimal interval of time required for the newly firing tube, acting through the condenser 56, to arrest firing of the other tube. It is to be understood that the tubes 43 and 44 are provided with suitable means for heating the cathodes, though not here shown.

For ready understanding of this invention, the operation of the circuit as thus far described will now be set forth. Let it be assumed, therefore, that the input signal is zero. Under this assumption, no current will be flowing in the coils 19 and 23. The saturable reactors 15 and 16 will thus be at full impedance and there will be no material difference in potential across either pair of output terminals. Let it next be assumed that the sign or polarity of the D. C. input signal is such that an increase in signal magnitude falls to the right of the vertical axis of the graph of Fig. 3. Under those circumstances and independently of the magnitude of the signal, the tube 43 will break down and the current i1 flowing in the D. C. coil 19 will immediately jump to the definite and constant value represented in Fig. 3, which is the full output of the tube 43, while the current i2 flowing in the coil 23 will remain at zero. With such flow of current in the coil 19, the impedance of the A. C. coils 17 and 18 associated therewith will decrease correspondingly and there will be a correspondingly smaller voltage drop across those coils and hence a material potential difference across the terminals 28. This potential difference will be independent of the magnitude of the signal and the output at terminals 28 will be of constant value at some definite magnitude dependent upon the magnitude of current i1. The impedance of the coils 21 and 22, however, will remain the same with no change in voltage drop across those coils for there has been no change in current in the control coil 23. Hence the output at terminals 29 will be zero or substantially so.

Figure 4:
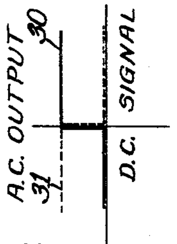
Fig. 4 is a diagram similar to Fig. 3 illustrating the character of the output of the second unit of the circuit.

If now it be assumed that the sign or polarity of the input signal is reversed, it will be noted that just the opposite occurs. Tube 44 will now break down and simultaneously condenser 56 will extinguish tube 43. The full output current of tube 44, as represented by i2 in Fig. 3, will now flow in control coil 23, while current in the coil 19 ceases to flow. This time the impedance of the coils 21 and 22 of the reactor 16 is decreased while the impedance of the coils 17 and 18 of the reactor 15 is restored to normal. Hence there results a material potential difference across the terminals 29 and no material potential difference across the terminals 28. As a consequence, there results a circuit having an alternating current output of the character shown in Fig. 4 in which the line 30 represents the output at terminals 28 and line 31 represents the output at terminals 29. The output, whether at terminals 28 or 29, is independent in magnitude of the magnitude of the D. C. input signal and which of the terminals has the output is determined by the sign or polarity of the D. C. input signal. Thus the circuit of Fig. 2 so far described results in control similar to that of a selector switch but obtains that control by means of a D. C. signal.

In this connection, it is also pointed out that, with the A. C. coils of the saturable reactors so connected as to prevent their inducing any voltage in the associated D. C. coil, the saturable reactor circuit is incapable of influencing the signal input circuit and thus reactions of the controlled signal, that is, the output of the saturable reactor circuit, be it of a character to be classified as a signal, or be it the actual power supplied to a load, such as a motor or the like, cannot be reflected back into the signal input circuit.

Figure 5:
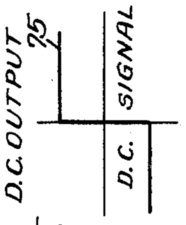
Fig. 5 is a diagram similar to Fig. 3 illustrating the character of the final output of the circuit.

In the embodiment of the invention shown in Fig. 2, the unit C is connected as the A. C. loads of the saturable reactor circuit. Herein, as already stated, the unit C is a rectifier and is, moreover, a rectifier which gives full wave rectified output. It is, moreover, of such construction that it takes the A. C. output of the saturable reactor unit A and converts the same to direct current the polarity of which is controlled by the sign of the input signal. Herein the rectifier unit C is composed of two gaseous type, full wave rectifier tubes 60 and 61 each having a pair of plates 62 and 63 and a cathode 64. The rectifier unit is inductively coupled to the saturable reactor circuit through the medium of a pair of transformers T1 and T2 each having a primary winding 65 and a secondary winding 66. The primary winding of the transformer T1 is connected to the terminals 28 and the primary winding of the transformer T2 is connected to the terminals 29 of the saturable reactor unit A. The tubes 60 and 61 are connected to operate in such manner that the D. C. output will be of one sign or polarity when the A. C. output is at the terminals 28, and of the opposite polarity when the A. C. output is at the terminals 29. To that end, the plates 62 and 63 of the tube 60 are by leads 67 and 68, respectively, connected to the ends of the secondary winding 66 of the transformer T1, and the plates 62 and 63 of the tube 61 are by leads 69 and 70, respectively, connected to the opposite ends of the secondary winding of the transformer T2. The cathode 64 of the tube 60 is by a lead 71 connected to the midpoint of the secondary winding of the transformer T2, while the cathode of tube 61 is by a lead 72 connected to the midpoint of the secondary winding of the transformer T1. Power output leads 73 are connected to the leads 71 and 72 and end in terminals 74 constituting the D. C. output terminals to which a D. C. load is shown connected. With a rectifier of the character here disclosed, the tube 60 will fire during both the positive and the negative half cycle of the output from the terminals 28. Similarly, the tube 61 will fire during both the positive and the negative half cycles of the output from the terminals 29 and thus in each instance full wave rectified output is obtained at the output terminals 74 of the rectifier but the polarity of the output will be reversed. Since full wave rectified output is obtained, it will be proportional in magnitude to the magnitude of the output of the saturable reactor circuit and hence will have the same off or full-on characteristic. Further, the D. C. output of the rectifier circuit will vary in polarity with the polarity of the input signal and thus there results an output such as represented by the line 75 of Fig. 5, namely, a D. C. output which is zero so long as the signal is zero, or a definite and constant value independent of the magnitude of the input signal but corresponding in sign to the sign of the input signal once firing of the tubes 43 and 44 has been initiated.

I claim as my invention:

1. An electrical control circuit comprising a D. C. signal input circuit having two sets of output terminals and operable so long as the signal remains zero to produce a direct current of zero magnitude at both sets of output terminals and operable once a signal of a magnitude other than zero is applied to produce at one or the other only of the sets of terminals a direct current of constant magnitude larger than zero and wholly independent of signal magnitude, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit for a pair of A. C. loads adapted for connection to a single power source, the A. C. coils of said reactors being connected in the supply circuit so that each reactor controls the output to one only of the loads, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

2. An electrical control circuit comprising a D. C. signal input circuit having two sets of output terminals and operable so long as the signal remains zero to produce a direct current of zero magnitude at both sets of output terminals and operable once a signal of a magnitude other than zero is applied to produce at one or the other only of the sets of terminals a direct current of constant magnitude larger than zero and wholly independent of signal magnitude, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit having two sets of output terminals and adapted for connection to a single A. C. power source, the A. C. coils of said reactors being connected in said supply circuit and operating in response to the sign of the input signal to determine at which set of terminals of said supply circuit the output is to occur, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

3. An electrical control circuit comprising a D. C. signal input circuit having two sets of output terminals and operable so long as the signal remains zero to produce a direct current of zero magnitude at both sets of output terminals and operable once a signal of a magnitude other than zero is applied to produce at one or the other only of the sets of terminals a direct current of constant magnitude larger than zero and wholly independent of signal magnitude, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit having two sets of output terminals and adapted for connection to a single A. C. power source, the A. C. coils of said reactors being connected in said supply circuit and operating in response to the sign of the input signal to determine at which set of terminals of said supply circuit the output is to occur, and a rectifier circuit forming the loads for said saturable reactor circuit comprising a pair of transformers each having a primary and a secondary winding, the primary of each transformer being connected to one set of terminals of said reactor circuit, and a pair of full wave rectifier tubes each having a pair of plates and a cathode, each of said tubes having the plates connected to the ends of the secondary winding of one of said transformers and its cathode connected to the midpoint of the secondary winding of the other of said transformers, and a pair of output terminals connected to the cathodes of said tubes.

4. An electrical control circuit comprising a D. C. signal input circuit having two sets of output terminals and operable so long as the signal remains zero to produce a direct current of zero magnitude at both sets of output terminals and operable once a signal of a magnitude other than zero is applied to produce at one or the other only of the sets of terminals a direct current of constant magnitude larger than zero and wholly independent of signal magnitude, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit having two sets of output terminals and adapted for connection to a common A. C. power source, the A. C. coil of each reactor being connected in series with only one set of said last named output terminals, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

5. An electrical control circuit comprising a D. C. signal input circuit comprising a pair of grid controlled, gaseous electron tubes each having a plate, a cathode and a grid and adapted for connection to a common plate voltage source, a common grid bias means biasing said tubes to prevent initial breakdown in the absence of a signal, a plate circuit for each of said tubes, a grid circuit for each of said tubes and means for extinguishing one tube upon firing of the other tube, a saturable reactor circuit comprising a pair of saturable reactors each having an A. C. coil and a control coil, said control coils being connected one in the plate circuit of each of said tubes, and an A. C. supply circuit having two sets of output terminals and adapted for connection to a single A. C. power source, the A. C. coils of said reactors being connected in said supply circuit and operating in response to the sign of the input signal to determine at which set of terminals of said supply circuit the output is to occur, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

6. An electrical control circuit comprising a D. C. signal input circuit comprising a pair of grid controlled, gaseous electron tubes each having a plate, a cathode and a grid and adapted for connection to a common plate voltage source, a common grid bias means biasing said tubes to prevent initial breakdown in the absence of a signal, a plate circuit for each of said tubes, a grid circuit for each of said tubes and means for extinguishing one tube upon firing of the other tube, a saturable reactor circuit comprising a pair of saturable reactors each having a pair of A. C. coils and a D. C. coil wound on a common core, the A. C. coils being so arranged as not to induce an A. C. voltage in the associated D. C. coil, said D. C. coils being connected one in the plate circuit of each of the tubes in said input circuit and an A. C. supply circuit having two sets of output terminals and adapted for connection to a single A. C. power source, the A. C. coils of each reactor being connected in series with only one set of output terminals and with the power source, and a full wave rectifier circuit connected to form the loads for said supply circuit and having output terminals for the connection of a D. C. load thereto, the output of said rectifier circuit being zero at zero output of said signal input circuit and at any signal magnitude causing output of said signal circuit being of a constant magnitude larger than zero and independent of signal magnitude but varying in sign with the sign of the input signal.

7. In an electrical control circuit, a D. C. signal input circuit comprising a pair of grid controlled, gaseous electron tubes each having a plate, a cathode and a grid, said circuit being adapted for connection to a common plate voltage source, a common grid bias means biasing said tubes to prevent initial breakdown in the absence of a signal, a plate circuit for each of said tubes, a grid circuit for each of said tubes and means for extinguishing one tube upon firing of the other tube and a saturable reactor circuit comprising a pair of saturable reactors each having a pair of A. C. coils and a D. C. coil wound on a common core, the A. C. coils being so arranged as not to induce an A. C. voltage in the associated D. C. coil, said D. C. coils being connected one in the plate circuit of each of the tubes in said input circuit and an A. C. supply circuit having two sets of output terminals and adapted for connection to a single A. C. power source, the A. C. coils of said reactors being connected in said supply circuit and operating in response to the sign of the input signal to cause output to occur at one or the other only of the sets of terminals.

PAUL GLASS.

REFERENCES CITED

The following references are of record in the file of this patent:

UNITED STATES PATENTS

| Number | Name | Date |
|---|---|---|
| 1,955,322 | Brown | Apr. 17, 1934 |
| 1,973,055 | Fitz Gerald | Sept. 11, 1934 |
| 2,276,752 | Willis | Mar. 17, 1942 |
| 2,338,423 | Geyger | Jan. 4, 1944 |
| 2,403,053 | Conklin | July 2, 1946 |

FOREIGN PATENTS

| Number | Country | Date |
|---|---|---|
| 38,015 | Netherlands | Apr. 15, 1936 |